United States Patent [19]

Lew

[11] Patent Number: 4,888,991

[45] Date of Patent: Dec. 26, 1989

[54] RELATIVE MOTION SENSOR

[76] Inventor: Hyok S. Lew, 7890 Oak St., Arvada, Colo. 80005

[21] Appl. No.: 273,462

[22] Filed: Nov. 21, 1988

[51] Int. Cl.[4] .............................................. G01R 27/26
[52] U.S. Cl. .................................. 73/658; 73/861.38; 310/369
[58] Field of Search ................. 73/658, 723, 774, 856, 73/861.18, 861.22, 861.24, DIG. 4, 861.37, 861.38; 310/313 C, 325, 338, 348, 354, 369

[56] References Cited

U.S. PATENT DOCUMENTS

| | | | |
|---|---|---|---|
| 3,698,249 | 10/1972 | Weaver | 73/723 |
| 3,858,440 | 1/1975 | Budraitis | 73/774 |
| 4,335,614 | 6/1982 | Dybel et al. | 73/774 |
| 4,404,854 | 9/1983 | Krempl et al. | 310/338 |

*Primary Examiner*—Michael J. Tokar
*Assistant Examiner*—Louis M. Arana

[57] ABSTRACT

A relative motion sensor sensing relative vibratory motions between two objects comprises a pair of elongated members joined to one another at the first extremities thereof and respectively include a fastening means disposed at the second extremities thereof opposite to the first extremities for affixing the second extremities to the two objects under the relative vibratory motion. A Piezo electric element is confined in a space between the two elongated members adjacent to the joined first extremities thereof, wherein the relative vibratory motions transmitted to the second extremities of the two elongated members alternately change the pressure exerted on the Piezo electric element by the two elongated members and, consequently, the Piezo electric element generates alternating electromotive forces representing the relative vibratory motions.

10 Claims, 2 Drawing Sheets 4,888,991

RELATIVE MOTION SENSOR

BACKGROUND OF THE INVENTION

In the Coriolis force or convective inertia force mass flowmeters, the rate of mass flow of media moving through a pair of parallel vibrating conduits under relative forced vibrations therebetween at the natural frequency is determined from the difference in the phase of the relative vibrations between two sections of the combination of the pair of vibrating conduits. At the present time, the relative vibrations between the two vibrating conduits are measured by motion detectors operating on the principles of the magnetic induction coil without any exceptions. As demonstrated by vibration sensing technology employed in the vortex shedding flowmeters, the Piezo electric vibration sensor provides far superior and greatly more sensitive motion detecting means compared with the magnetic induction coil that does not work at all in detecting the vibratory motions created by the vortex shedding phenomena. The application of a Piezo electric vibration detector to the mass flowmeter of vibrating tube types should increase the sensitivity as well as reliability of the mass flowmeter.

BRIEF SUMMARY OF THE INVENTION

The primary object of the present invention is to provide a Piezo electric relative vibration sensor.

Another object is to provide a Piezo electric relative vibration sensor comprising a pair of elongated members joined to one another at the first extremities thereof and affixed to two objects under relative vibrations at the second extremities thereof opposite to the first extremities, respectively, wherein a Piezo electric element is confined in a space between the two elongated members adjacent to the joined first extremities thereof.

A further object is to provide a Piezo electric relative vibration sensor including a Piezo electric disc pinched between the two elongated members, wherein alternating change in the pinching pressure on the Piezo electric disc generates alternating electromotive force representing the relative vibrations between the two elongated members.

Yet another object is to provide a Piezo electric relative vibration sensor including a Piezo electric cylindrical shell confined within a circular cavity disposed in the joined first extremities of the two elongated members, which circular cavity has at least one slitted opening intermediate the two elongated members, wherein alternating change in the hoof stress in the Piezo electric cylindrical shell generates alternating electromotive force representing the relative vibrations between the two elongated members.

Yet a further object is to provide a Piezo electric relative vibration sensor that includes a third elongated member extending to a direction generally opposite to the two elongated members, wherein the Piezo electric relative vibration sensor detects relative vibrations between the two elongated members or between one of the two elongated members and the third elongated member.

Still another object is to provide a piezo electric relative vibration sensor including a pair of Piezo electric elements wherein the electromotive forces from the two Piezo electric elements are combined in such a way that the noises are cancelled therebetween and pure signals representing the relative vibrations between two elongated members are extracted.

Still a further object is to provide a highly sensitive and extremely reliable relative vibration detector that is inexpensive and light weight.

These and other objects of the present invention will become clear as the description thereof pregresses.

BRIEF DESCRIPTION OF THE FIGURES

The present invention may be described with a great specificity and clarity by referring to the following figures.

DESCRIPTION OF THE ILLUSTRATED EMBODIMENTS

Figure 1:
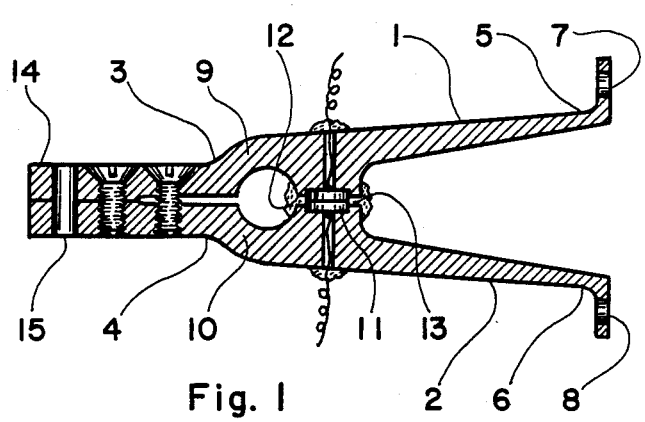
FIG. 1 illustrates a cross section of an embodiment of the relative motion sensor of the present invention, that employs at least one Piezo electric element of a disc shape.

In FIG. 1 there is illustrated a cross section of an emobidment of the relative motion sensor constructed in accordance with the principles of the present invention. The relative motion detector comprises a pair of elongated members 1 and 2 disposed in a generally parallel or skewed arrangement, wherein the first extremities thereof 3 and 4 are connected to one another and the second extremities 5 and 6 respectively include securing means 7 and 8 for fastening the second extremities 5 and 6 to two objects under a relative vibratory motion relative to one another, which vibratory motion is to be measured. In this particular construction, the slender sections 9 and 10 respectively included in the two elongated members 1 and 2 and disposed adjacent to the connected extremities thereof provide a spring biased connection between the two elongated members 1 and 2 at the connected extremities thereof. A single or stacked pair of disc shaped Piezo electric elements 11 is disposed between the two bearing surfaces 12 and 13 respectively included in the two elongated members 1 and 2 in a squeezed relationship, wherein the two bearing surfaces 12 and 13 compress the disc shaped Piezo electric element 11 therebetween. The conductor wires extending from the Piezo electric element 11 extend through holes disposed through the elongated members 1 and 2. The Piezo electric element may be sealed in a resilient water-proofing material. The connected extremities of the two elongated members 1 and 2 may include an extension 14 with a securing means 15 disposed at the extremity of the extension 14. When one of the two securing means 7 and 8, and the securing means 15 are respectively fastened to two objects under a relative vibratory motion, the relative motion sensor detects the relative vibration between the two objects. Of course, it is standard to respectively fasten the securing means 7 and 8 to the two objects to measure the relative vibratory motion therebetween. Therefore, the extension 14 and the securing means 15 may be omitted in a modified version of the emobidment shown in FIG. 1.

Figure 2:
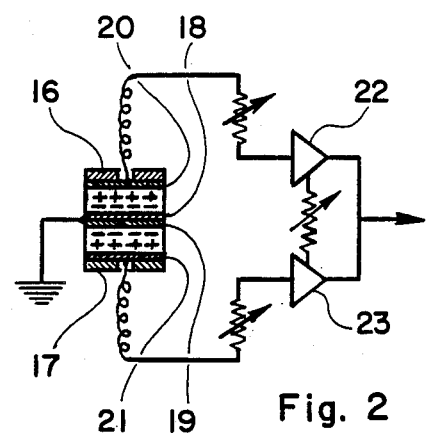
FIG. 2 illustrates the operating principles of a pair of Piezo electric elements of a stacked arrangement employed in the relative motion sensor shown in FIG. 1.

In FIG. 2 there is illustrated an embodiment of the Piezo electric element package that can be employed as the element 11 in the relative motion sensor shown in FIG. 1. This Piezo electric element package comprises a pair of disc shaped Piezo electric elements 16 and 17, disposed in a stacked arrangement in such a way that the polarizations of the two Piezo electric discs 16 and 17 are opposite to one another. The first electrodes 18 and 19 of the two Piezo electric elements 16 and 17 in contact to one another are grounded, while the second electrodes 20 and 21 are respectively connected to a pair of amplifiers 22 and 23 which superimpose the two signals from the second electrodes 20 and 21 after balancing the noises therebetween by using adjustable resistors or variable gains. The combined electro motive force with balanced out noises between the two amplifiers represents the relative vibrations between two objects respectively anchoring the securing means 7 and 8; or one of the two securing means 7 and 8, and the securing means 15.

Figure 3:
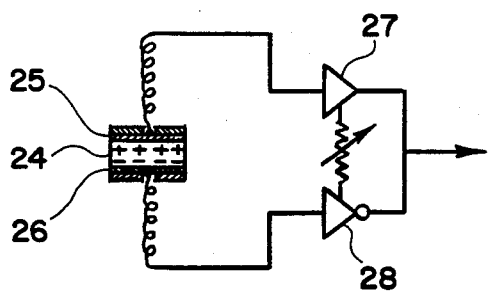
FIG. 3 illustrates an operating principle of a single Piezo electric element employed in the relative motion sensor shown in FIG. 1.

In FIG. 3 there is illustrated a single disc shaped Piezo electric element 24 usable as the element 11 included in the relative motion sensor shown in FIG. 1. The two electromotive forces respectively tapped from the two electrodes 25 and 26 are respectively amplified by an amplifier 27 and an inverting amplifier 28 and added to one another after balancing out the noises therebetween by using the adjustable resisitors or variable gains. The resultant electromotive force represents the relative vibrations.

Figure 4:
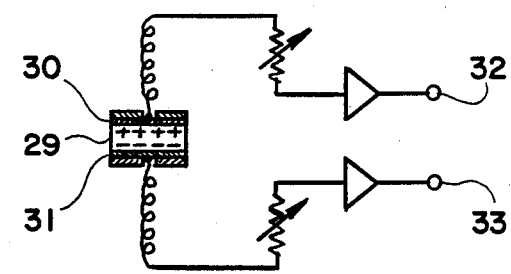
FIG. 4 illustrates another operating principle of a single Piezo electric element employed in the relative motion detector shown in FIG. 1.

In FIG. 4 there is illustrated another single disc shaped Piezo electric element 29 usable as the element 11 included in the relative motion detector shown in FIG. 1. The two electromotive forces from the two electrodes 30 and 31 are tapped differentially after balancing out the noises therebetween. The electromotive force across the two terminals 32 and 33 represents the relative vibrations.

Figure 5:
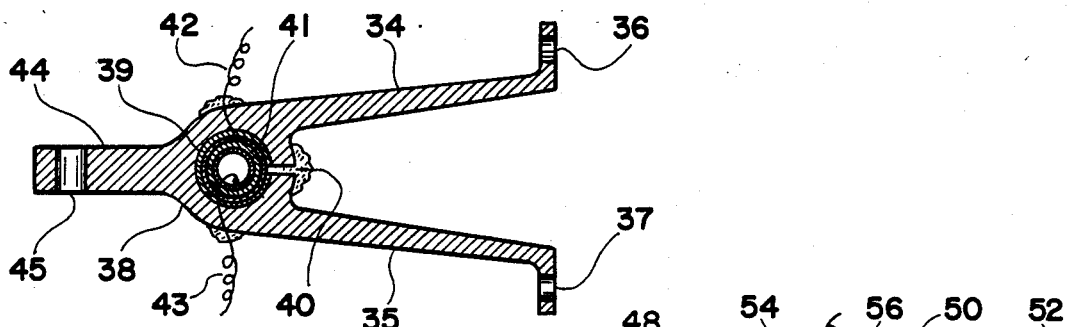
FIG. 5 illustrates a cross section of an embodiment of the relative motion detector of the present invention that employs a Piezo electric element of a cylindrical shell shape.

In FIG. 5 there is illustrated a cross section of an embodiment of the relative motion sensor of the present invention, that employs a cylindrical shell Piezo electric element. The two elongated members 34 and 35 respectively with the securing means 36 and 37 extend from a connected extremity 38 that includes a bore 39 with a slitted opening 40 open to a space intermediate the two elongated members 34 and 35. A cylindrical shell Piezo electric element 41 is press-fitted into the bore 39. A pair of conductor wires 42 and 43 respectively extend from the outer and inner cylindrical shell electrodes sandwiching the cylindrical shell Piezo electric element 41 therebetween in a coaxial arrangement, which two conducting wires 42 and 43 may be connected to summing amplifiers as shown in FIG. 2 and 3 or to differential amplifiers as shown in FIG. 4. The relative motion sensor may include an extension 44 with a securing means 45, which combination has the same function as the combination of the elements 14 and 15 included in the emobidment shown in FIG. 1. The relative motion sensor shown in FIG. 5 operates on the same principles as those described in conjunction with FIGS. 1, 2, 3 and 4.

Figure 6:
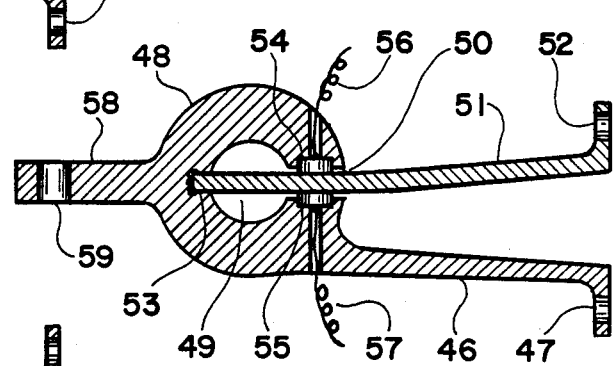
FIG. 6 illustrates a cross section of an embodiment of the relative motion sensor of the present invention employing a pair of disc shaped Piezo electric elements.

In FIG. 6 there is illustrated a cross section of an embodiment of the relative motion sensor of the present invention. A first elongated member 46 with a securing means 47 extends from a rigid body 48 including a bore 49 with a slitted opening 50. A second elongated member 51 with a securing mean 52 at one extremity is anchored to the rigid body at the extremity 53 thereof and extends across the bore 49 and through the slitted opening 50 with a clearance. A pair of disc shaped Piezo electric elements 54 and 55 respectively pressed onto two opposite surfaces of the second elongated member 51 are squeezed between two bearing surfaces of the slitted opening 50. The two pairs of conducting wires 56 and 57 respectively extending from the two Piezo electric elements 54 and 55 are connected to two summing amplifies as shown in FIG. 2. The embodiment shown in FIG. 6 may include only one disc shaped Piezo electric element squeezed between one surface of the second elongated member 51 and one bearing surface of the slitted opening 50 instead of the pair shown in the particular illustrated embodiment, wherein the single Piezo electric element is connected to the noise eliminating circuit shown in FIG. 3 or 4. The relative motion sensor shown in FIG. 6 may include an extension 58 with a securing means 59, which combination has the same function as the combination of the elements 14 and 15 included in the embodiment shown in FIG. 1.

Figure 7:
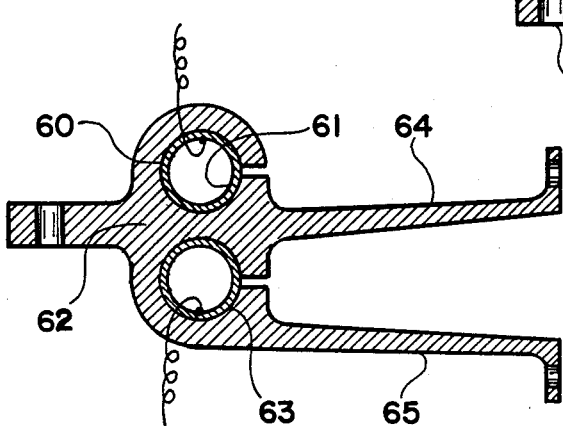
FIG. 7 illustrates a cross section of an embodiment of the relative motion sensor of the present invention employing a pair of cylindrical shell Piezo electric elements.

In FIG. 7 there is illustrated a cross section of an embodiment of the relative motion detector of the present invention employing a pair of cylindrical shell Piezo electric elements, which embodiment has essentially the same elements and construction as the embodiment shown in FIG. 5 with one exception being that it includes a second cylindrical shell Piezo electric element 60 press-fitted into a bore 61 included in a rigid body 62, which cylindrical shell Piezo electric element is disposed in a parallel relationship with respect to the first cylindrical shell Piezo electric element 63 on the opposite side of the plane including one of the two elongated members 64 and 65. The two conducting wires respectively extending from the electrodes of the same polarity of the two cylindrical shell Piezo electric elements 61 and 63 are connected to the noise eliminating circuits such as that shown in FIG. 2.

Figure 8:
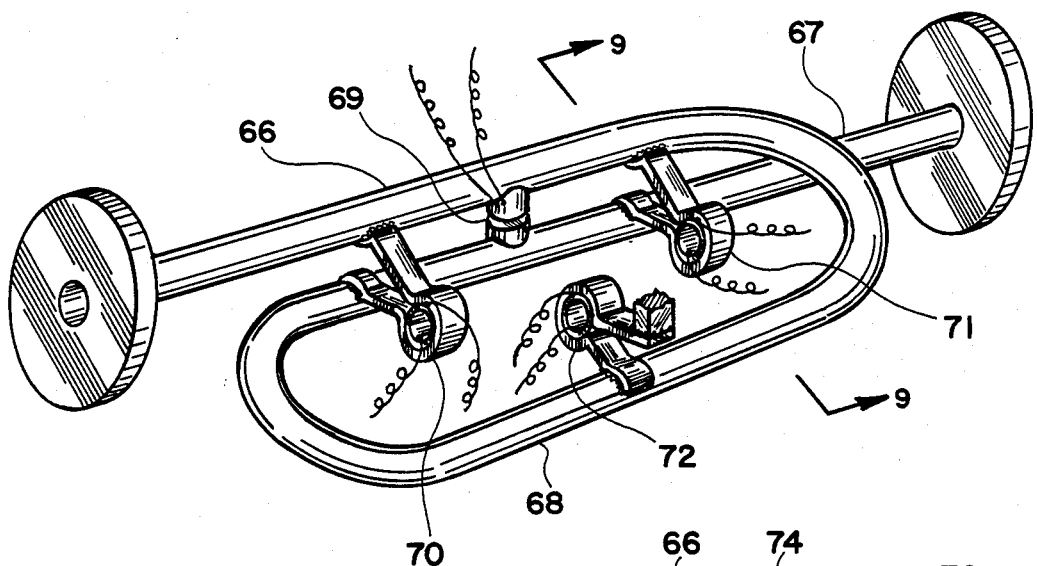
FIG. 8 illustrates an application of the relative motion sensors to the convective inertia force mass flowmeter.

In FIG. 8 there is illustrated an example of an application of the relative motion sensor of the present invention shown in FIGS. 1, 5, 6 or 7. The convective inertia force flowmeter invented by the same inventor of the present invention comprises a conduit providing a flow passage, that includes an inlet section 66 and an outlet section 67 connected to one another by a looped midsection 68. The electromagnetic vibrator 69 vibrates the inlet and outlet sections 66 and 67 relative to one another. The mass flow rate through the conduit is determined from the amount of phase difference between two relative vibratory motions respectively detected by the two relative motion detectors 70 and 71. The mass flow rate can also be determined from the amplitude of the vibratory motion detected by the relative motion detector 72 with its first leg anchored to the nodal section of the conduit and the second leg anchored to a stationary frame, as the amplitude of the vibratory motion at the nodal section vanishes when the mass flow rate is equal to zero and increases with the increasing mass flow rate.

Figure 9:
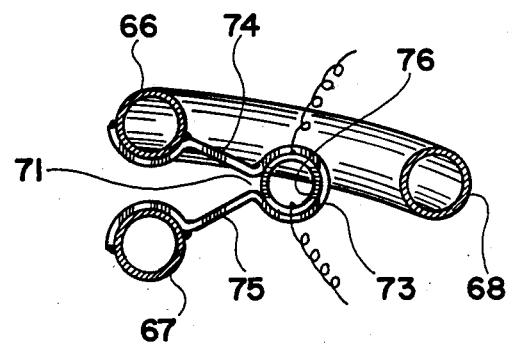
FIG. 9 illustrates a cross section of the embodiment shown in FIG. 8.

In FIG. 9 there is illustrated a section of the mass flowmeter illustrated in FIG. 8, which cross section is taken along plane 9—9 as shown in FIG. 8. The relative motion detector 71 is a light weight version of the embodiment shown in FIG. 5, that is made of a sheet metal strip of spring steel, which includes a coil 73 and a pair of legs 74 and 75 extending therefrom wherein the cylindrical shell Piezo electric element 76 is press-fitted into the coil 73. Of course, the relative motion detectors of other embodiments shown in FIG. 1, 6 or 7 may be employed in place of the particular embodiment shown in FIG. 9.

Figure 10:
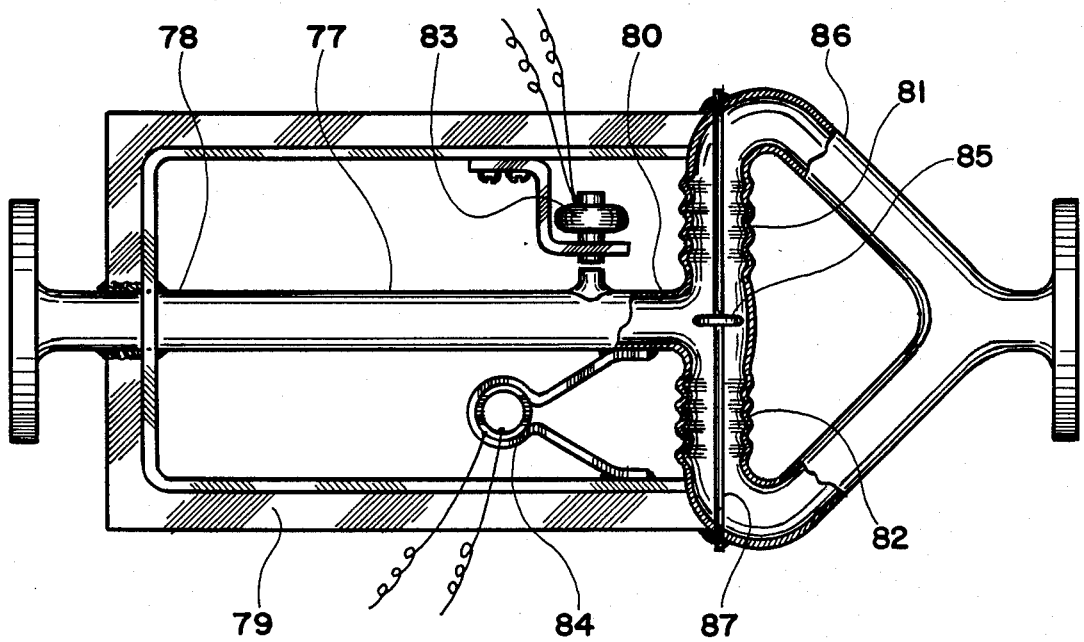
FIG. 10 illustrates an application of the relative motion sensor to the convective attenuation flowmeter.

In FIG. 10 there is illustrated another example of application of the relative motion sensor of the present invention shown in FIG. 1, 5, 6 or 7. The convective attenuation flowmeter invented by the same inventor of the present invention comprises a conduit 77 with one extremity 78 fixedly secured to a rigid frame 79 and the other extremity 80 connected to a T-shaped pipe coupling including a pair of bellow couplings 81 and 82. An electromagnet 83 intermittently induces a flexural vibration of the conduit 77. The relative motion detector 84 provides electric signals that show the attenuation of the flexural vibration of the conduit 77. The mass flow rate through the conduit 77 is determined from the attenuation of the flexural vibration of the conduit, as the severity of attenuation of the flexural vibration increases with increasing mass flow rate. The T-shaped coupling providing a laterally deflectable connection for the extremity 80 of the conduit 77 may include a rigidly fixed flow guide disc 85 that is anchored to the rigid section of the Y-shaped outlet 86 by a supporting rod extending through and affixed to the flow guide disc 85.

While the principles of the present invention have now been made clear by the illustrated embodiments, there will be many modifications immediately obvious to those skilled in the art in the design of the structures, arrangements, proportions, elements and materials, which are particularly adapted to the specific working environments and operating conditions in the practice of the invention without departing from those principles. It is not desired to limit the inventions to the particular illustrated embodiments shown and, accordingly, all suitable modifications and equivalents may be resorted to falling within the scope of the inventions as defined by the claims which follow.

The embodiments of the invention in which an exclusive property or privilege is claimed, are as follows:

1. A device for detecting relative motion between two objects comprising in combination:
    (a) a first and second elongated members disposed in a side by side arrangement with a space therebetween and connected to one another at first extremities thereof, wherein second extremities of the first and second elongated members opposite to said first extremities include securing means; and
    (b) at least one Piezo electric element of the disc shape disposed intermediate said first and second extremities of the first and second elongated members and between the first and second elongated members in a squeezed arrangement therebetween;
    whereby the first and second elongated members respectively connected to two objects under relative motion experience relative pivoting movement about a pivot axis located at said first extremities of the first and second elongated members and the Piezo electric element generates elctrical signal representing the relative motion between the two objects.

2. The combination as set forth in claim 1 wherein said combination includes a further securing means for securing said first extremities of the first and second elongated members to a supporting structure.

3. A device for detecting relative motion between two objects comprising in combination:
    (a) a first and second elongated members disposed in a side by side arrangement with a space therebetween and connected to one another at first extremities thereof, wherein second extremities of the first and second elongated members opposite to said first extremities include securing means; and
    (b) at least one Piezo electric element of cylindrical shell shape fitted into a cylindrical cavity included in the combination of the first and second elongated members and disposed intermediate said first and second extremities of the first and second elongated members, wherein said cylindrical cavity comprises two halves respectively included in the first and second elongated members;
    whereby the first and second elongated members respectively connected to two objects under relative motion experience relative pivoting movement about a pivot axis located at said first extremities of the first and second elongated members and the Piezo electric element generates electrical signal representing the relative motion between the two objects.

4. The combination as set forth in claim 3 wherein said combination includes a further securing means for securing said first extremities of the first and second elongated members to a supporting structure.

5. The combination as set forth in claim 3 wherein said combination includes another Piezo electric element of cylindrical shell shape fitted into another cylindrical cavity included in one of the first and second elongated members at the first extremity thereof in a parallel arrangement with respect to said at least one Piezo electric element, whereby two electrical signals respectively generated by said at least one and another Piezo electric elements can be combined to cancel noises therebetween.

6. The combination as set forth in claim 5, wherein said combination includes a further securing means for securing said first extremities of the first and second elongated members to a supporting structure.

7. A device for detecting relative motion between two objects comprising in combination:
    (a) a generally rigid body including a cavity with an opening and a first elongated member extending therefrom, wherein the first elongated member includes a securing means disposed at the extremity thereof;
    (b) a second elongated member with one extremity secured to said generally rigid body extending across said cavity and extending through said opening in a direction generally parallel to the first elongated member, wherein said second elongated member includes a securing means disposed at the other extremity thereof opposite to said one extremity; and (c) at least one Piezo electric element of disc shape disposed within said opening intermediate said generally rigid body and one side of the second elongated member in a squeezed arrangement therebetween;

whereby the first and second elongated members respectively connected to two objects under relative motion experience relative pivoting movement about a pivot axis located at said generally rigid body and the Piezo electric element generates electrical signal representing the relative motion between the two objects.

8. The combination as set forth in claim 7 wherein said combination includes a further securing means for securing said gnerally rigid body to a supporting structure.

9. The combination as set forth in claim 7 wherein said combination includes another Piezo electric element of disc shape disposed within said opening intermediate said generally rigid body and the other side of the second elongated member opposite to said one side in a squeezed arrangement therebetween, whereby two electrical signals respectively genrated by said at least one and another Piezo electric elements can be combined to cancel noises therebetween.

10. The combination as set forth in claim 9 wherein said combination includes a further securing means for securing said generally rigid body to a supporting structure.

* * * * *